Patented Sept. 8, 1953

2,651,563

UNITED STATES PATENT OFFICE 2,651,563

METHOD OF PREPARING PURE BARIUM AND STRONTIUM HYDROXIDES

Mahlon J. Rentschler, Willoughby, Ohio; Delia J. Rentschler, executrix of said Mahlon J. Rentschler, deceased No Drawing. Application September 24, 1947, Serial No. 775,969

4 Claims. (Cl. 23—186)

1

This invention relates to the production of chemically pure materials, especially to the preparation of pure barium and strontium hydroxides from their carbonates.

Heretofore, barium oxide and strontium oxide have usually been prepared by reducing the carbonates, usually the natural carbonates, of barium and strontium by firing such carbonates with an intimate mixture of carbon. The natural carbonates of barium and strontium, which are Witherite and Strontianite, respectively, usually contain various impurities the amount of which varies with the specific material being processed, and the purity of the oxide produced depends upon the purity of the carbonates used as a starting material. It is common practice in the production of hydroxide (and hydrates) of the class indicated above, to treat the oxide first produced with hot water, filter the resultant solution to remove insoluble impurities therefrom and thereafter crystallize the hydroxide in hydrate form from the filtrate by cooling the same. Such a method of producing barium and strontium hydroxides and hydrates is satisfactory where the original carbonates and, especially, the oxides produced are free from water soluble impurities. However, since both natural and artificial carbonates of barium and strontium usually contain iron and sulphur compounds as impurities in a water insoluble form, which impurities are converted to soluble materials by the firing action, such impurities pass into solution with the oxides when they are treated with water to dissolve same and form hydroxides and hydrates therefrom. Thus the impurities go into solution and remain in the solution to contaminate the crystals of hydrate obtained from the filtrate of the solution. These soluble impurities of iron and sulphur are very difficult to remove from the crystals and can only be removed by long and costly processing.

The general object of the present invention is to avoid and overcome the foregoing and other difficulties and disadvantages of previous methods for the production of pure barium and strontium hydroxides.

Another object of the invention is to render water soluble impurities in barium and strontium oxides insoluble.

A further object of the invention is to modify

2 known methods of producing barium and strontium hydroxides and to achieve the production of a purer end product.

Yet another object is to increase the percent of yield in a process for forming barium and strontium hydroxides.

Another object of the invention is to utilize magnesium oxide in the processing of a carbonate of barium or strontium so as to produce barium or strontium hydroxides with no soluble iron or sulphur compounds therein.

Another object of the invention is to provide an inexpensive, uncomplicated process for effectively removing all soluble iron and sulphur compounds from strontium and barium hydroxides.

The salient feature of the present invention is that I have found that magnesium oxide or hydroxide will convert water soluble iron and sulphur materials normally existing in barium and strontium carbonates after their reduction to oxides to an insoluble form whereby the iron and sulphur readily can be removed from the mixture being processed to form pure barium and strontium hydroxides or hydrates therefrom.

Specifically, in practicing the process of the invention, I prefer to form barium or strontium oxide in general accord with the teachings set forth in my previous U. S. Patent No. 1,913,289 wherein particles of a carbonate of barium or strontium are intimately mixed with particles of carbon, then heated under reducing conditions. This action produces carbon monoxide and the desired oxide of barium or strontium, depending upon the composition of the starting carbonate material. Usually, in processing the carbonate-carbon mixture, I have added a suitable quantity of magnesium oxide particles to the mix before it is fired. The magnesium oxide and the remainder of the material, all the components of which are of small particle size, is thoroughly mixed before it is fired. The heating effects the production of the desired barium or strontium oxide with the gaseous carbon monoxide produced passing out of the reaction mixture. The heating action also normally converts the iron and sulphur to soluble material, or materials that heretofore have been extremely difficult to separate from the oxides. Next, in the production of hydroxides or hydrates, the resulting oxide is treated with hot water, i. e. hydrated, so as to form the desired hydroxide. Tests of the solution produced indicate that no soluble iron or sulphur is present therein and this result is due, I have found, to the presence of the magnesium oxide in the material being processed. It is thought that the iron and sulphur may form a substance such as:

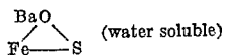 (water soluble)

which in the presence of MgO and H₂O changes to (water insoluble) 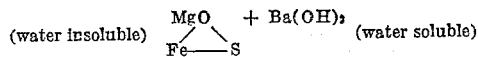 (water soluble)

The compound formed by magnesium oxide and iron and sulphur is insoluble and hence the magnesium oxide will remove all of such materials from the solution of hydroxide being processed. The solution is then filtered and the insoluble iron or sulphur impurities therein, together with any excess magnesium oxide originally in the carbonate starting material is removed. The strontium or barium hydroxide present in the solution is then crystallized therefrom as a hydrate by usually cooling the filtrate so obtained so that the desired hydrate can readily be recovered from its solution. Since magnesium oxide is insoluble in hot water solutions of either barium or strontium hydroxide, the resulting products are magnesium free.

It also has been found that the magnesium oxide need not be added to the original carbonate material but that the magnesium oxide can be added to the barium or strontium oxide prior to its hydration, or it may be added to the hot solution of barium or strontium hydrates before filtering. In all events, as pointed out hereinbefore, the magnesium oxide appears to effect some combination with the soluble iron and sulphur present in the material after it has been processed to barium or strontium oxide and convert such soluble impurities produced in the processing to insoluble material or materials which can readily be removed from the material being processed.

The magnesium oxide used in the practice of the invention can be obtained from practically any source but I prefer to use the product obtained from the calcination of natural magnesite since it contains no objectionable soluble material and is cheaper than any of the synthetic grades of magnesium oxide now available.

The quantity of magnesium oxide necessary to purify the hydrates produced is determined by the amount of impurities present in the original carbonate. Impurities for the purpose of the present invention are taken to mean only the insoluble iron and sulphur compounds, such as pyrites, for example, ferrous disulphide, which normally are the most important impurities present in barium carbonate or strontium carbonate in either natural or synthetic form.

I have found that for a precipitated barium carbonate containing approximately 5% impurities, I can achieve a very pure product by the use of about 50% magnesium oxide by weight of the impurities. Thus, for 100 g. of a particular barium carbonate containing approximately 5 g. of impurities, I use about 2.5 g. of magnesium oxide by weight. Where natural barium carbonate is used, and the total iron and sulphur compounds are usually considerably higher than 5% by weight of the carbonate, then I use slightly more than 50% magnesium oxide by weight to the weight of the insoluble impurities in the material to be processed. The insolubility of the magnesium oxide is indicated by the fact that the end product is free from magnesium. It has been established that excess amounts of magnesium oxide are not detrimental to the process of the invention so that an excess of the material should always be provided since it can readily be removed with the insoluble iron and sulphur compounds produced as set forth herein when the oxides are dissolved in the hot water solvent used in converting the oxides to the desired hydroxide. Hence, I use at least 50% by weight of the iron and sulphur present in the starting material of magnesium oxide to effectively remove all iron and sulphur from the hydroxide produced.

A further feature of the invention is that the residues of the original carbonate filtered from the solution of the hydroxide produced have been used in the manufacture of bricks and when iron is present in such residue, in accordance with the present invention, such residue is very desirable for use in brick manufacture because it aids in the production of a strongly red colored brick. Previous types of residues have been highly colored and have not aided in producing a red colored brick.

It has also been found that magnesium hydroxide may be used in place of the magnesium oxide since the hydroxide also is insoluble in water and in hot solutions of the hydrates of barium and strontium. It also is possible to use mixtures of the oxide and hydroxide of magnesium, if desired, although normally the oxide is used alone since it is cheaper than hydroxide and functions extremely effectively and satisfactorily to remove the undesirable soluble iron and/or sulphur compounds present in the oxides, as set forth hereinabove.

The magnesium material used not only removes the soluble iron and sulphur compounds produced from original insoluble materials in the starting carbonate, but also removes any soluble iron and/or sulphur picked up by the material as it is being processed, such as from scale or rust on the surfaces of the containers. Hence the material should be retained in thoroughly clean apparatus after the magnesium is removed so as to retain its pure condition.

While one complete embodiment of the invention has been disclosed herein, it will be appreciated that modification of this particular embodiment of the invention may be resorted to without departing from the scope of the invention as defined by the appended claims.

Having thus described my invention, what I claim is:

1. The process of producing a chemically pure hydroxide of the class consisting of barium hydroxide and strontium hydroxide from their corresponding impure carbonate form containing initially water insoluble iron and sulphur compounds and comprising the steps of dry mixing a material from the class consisting of magnesium oxide and magnesium hydroxide with the selected carbonate, heating the carbonate mixture in the presence of carbon to produce an oxide of the starting carbonate, treating the oxide mixture with hot water to produce a hydroxide of the starting carbonate which dissolves in the water present, the substance from the class of materials consisting of magnesium oxide and magnesium hydroxide being present in an amount at least theoretically sufficient to combine chemically with the iron and sulphur materials present and combining therewith in the presence of water to produce insoluble materials, filtering the material to remove the water insoluble compounds present and any excess water insoluble materials from the class consisting of magnesium hydroxide and magnesium oxide, and recovering the hydroxide of the starting carbonate from the remaining solution.

2. The process as in claim 1 wherein the impure carbonate contains about 5% by weight of insoluble iron and sulphur compounds and about 2.5% by weight of magnesium oxide is added to the carbonate starting material.

3. The process of producing a chemically pure hydroxide of the class consisting of barium hydroxide and strontium hydroxide from their corresponding impure carbonate form containing initially water insoluble iron and sulphur compounds and comprising the steps of preparing a batch by dry mixing carbon particles with the selected carbonate, heating the mixture to produce an oxide of the starting carbonate, treating the oxide mixture with hot water to produce a solution of the hydroxide of the starting carbonate, adding magnesium oxide to the batch to combine with the iron and sulphur present after heating to form an insoluble material and filtering the material to remove the water insoluble material present.

4. In the method of producing a chemically pure hydroxide of the class consisting of barium hydroxide and strontium hydroxide from their corresponding impure carbonate form containing initially water insoluble iron and sulphur compounds comprising the steps of preparing a dry mixture containing carbon particles with the selected carbonate, heat calcining the mixture to produce a product containing the oxide form of the starting carbonate, treating the product thus obtained with hot water producing a solution of the hydroxide and insoluble Fe and S complex, filtering the solution to separate out said Fe and S complex, and recovering the thus purified selected hydroxide, the step of adding a material from the class consisting of MgO and $Mg(OH)_2$ in the process prior to the filtering operation.

MAHLON J. RENTSCHLER.

References Cited in the file of this patent

UNITED STATES PATENTS

| Number | Name | Date |
|---|---|---|
| 647,320 | Newberry | Apr. 10, 1900 |
| 1,106,578 | Newberry et al. | Aug. 11, 1914 |
| 1,913,289 | Rentschler | June 6, 1933 |
| 1,947,952 | Nitzschke | Feb. 20, 1934 |
| 2,016,529 | Windecker | Oct. 8, 1935 |
| 2,016,530 | Windecker | Oct. 8, 1935 |